US010090927B2

United States Patent
Nakashima et al.

(10) Patent No.: US 10,090,927 B2
(45) Date of Patent: Oct. 2, 2018

(54) DIGITAL SIGNAL PROCESSING CIRCUIT AND SIGNAL PROCESSING DEVICE THAT INCLUDES A PLURALITY OF DIGITAL SIGNAL PROCESSING CIRCUITS

(71) Applicant: FUJITSU LIMITED, Kawasaki-shi, Kanagawa (JP)

(72) Inventors: Hisao Nakashima, Kawasaki (JP); Yoshitaka Nomura, Shinagawa (JP); Tomofumi Oyama, Kawasaki (JP); Yi Ge, Bunkyo (JP); Yuichi Akiyama, Kawasaki (JP); Yoshio Hirose, Hachioji (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/490,085

(22) Filed: Apr. 18, 2017

(65) Prior Publication Data
US 2017/0310394 A1    Oct. 26, 2017

(30) Foreign Application Priority Data
Apr. 22, 2016 (JP) .................................. 2016-085785

(51) Int. Cl.
*H04B 10/00* (2013.01)
*H04B 10/2513* (2013.01)
*H04L 1/00* (2006.01)

(52) U.S. Cl.
CPC ....... *H04B 10/2513* (2013.01); *H04L 1/0042* (2013.01); *H04L 1/0057* (2013.01)

(58) Field of Classification Search
CPC ........ H04B 10/40; H04B 10/43; H04B 10/58; H04B 10/616; H04B 10/0067; H04B 10/0066; H04B 10/6161; H04J 14/02

USPC ......... 398/135, 136, 138, 139, 79, 183, 188, 398/202, 204, 205, 206, 207, 208, 158, 398/159, 81, 45, 48, 49, 209
See application file for complete search history.

(56) References Cited

U.S. PATENT DOCUMENTS

| | | | | |
|---|---|---|---|---|
| 7,529,489 B2* | 5/2009 | Chiesa | ................... | H04J 3/1611 |
| | | | | 398/138 |
| 9,071,364 B1* | 6/2015 | Voois | ...................... | H04B 10/58 |
| 2017/0237498 A1* | 8/2017 | Essiambre | ............. | H04B 10/40 |
| | | | | 398/136 |

FOREIGN PATENT DOCUMENTS

| | | |
|---|---|---|
| JP | S63-221708 A | 9/1988 |
| JP | H06-112854 A | 4/1994 |

* cited by examiner

*Primary Examiner* — Hanh Phan
(74) *Attorney, Agent, or Firm* — Fujitsu Patent Center

(57) ABSTRACT

A signal processing device includes digital signal processing circuits. Each of the digital signal processing circuits includes: a regeneration circuit that regenerates a bit stream front an electric field information signal of an optical signal; an error correction circuit that corrects an error in the bit stream; an encoder circuit that generates an encoded bit stream from received data; and a generation circuit that generates an electric field information signal from the encoded bit stream. An electric field information signal or a bit stream is given from a regeneration circuit, an encoder circuit or a generation circuit in a first digital signal processing circuit to a second digital signal processing circuit. A regeneration circuit, an error correction circuit or a generation circuit in the second digital signal processing circuit processes the electric field information signal or the bit stream given from the first digital signal processing circuit.

7 Claims, 12 Drawing Sheets

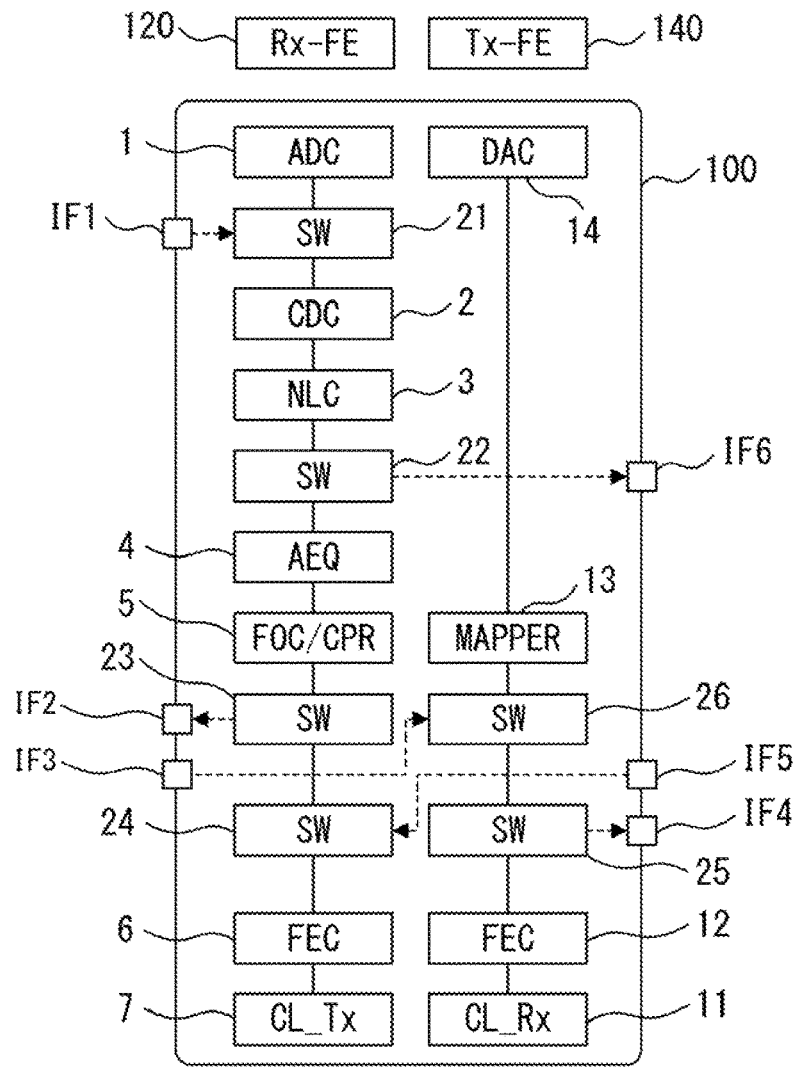
F I G. 1

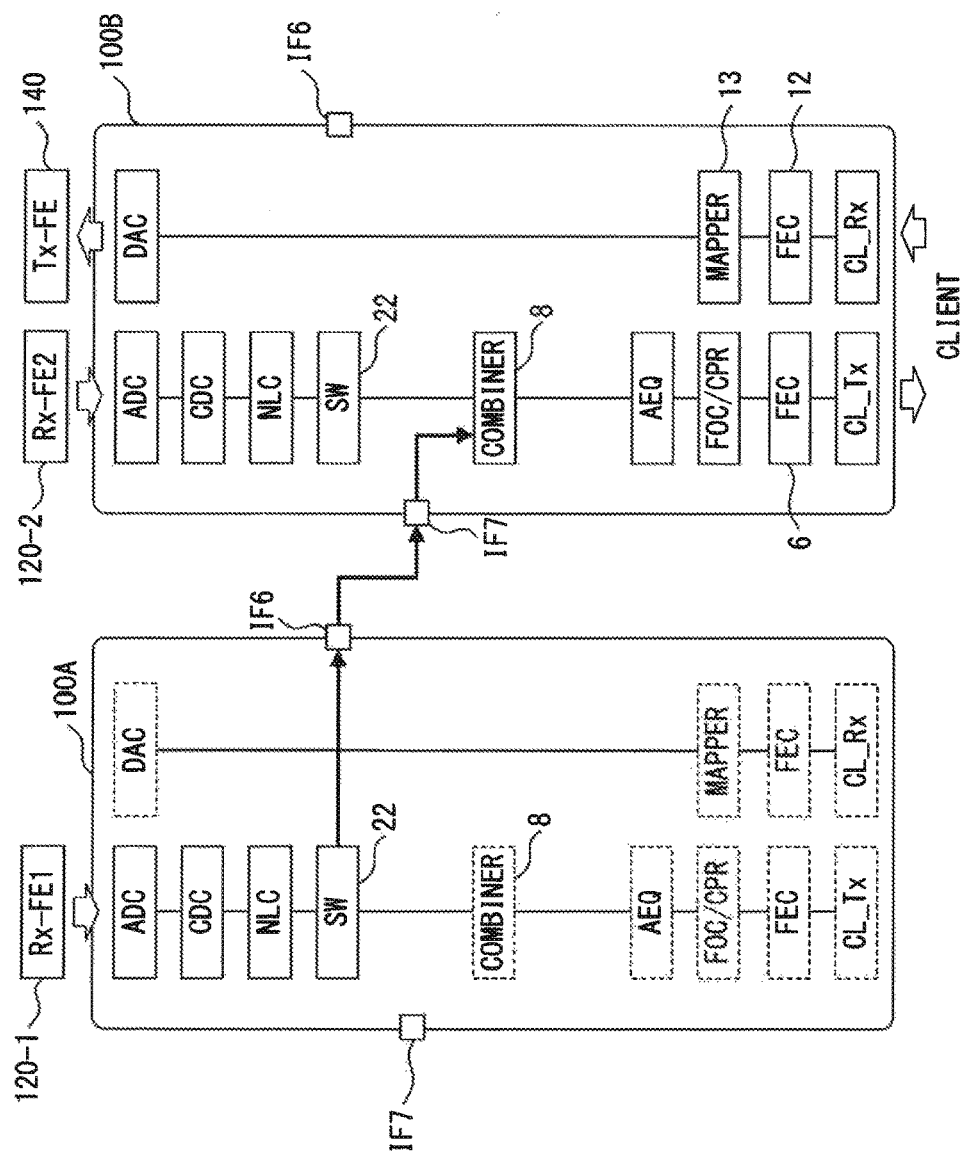
F I G. 6

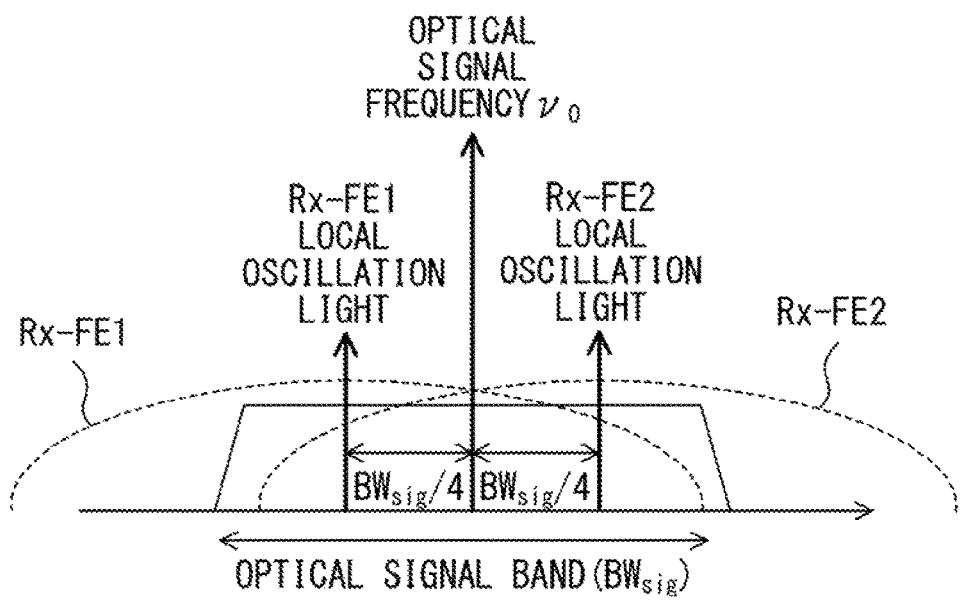
F I G. 7

F I G. 1 2 A
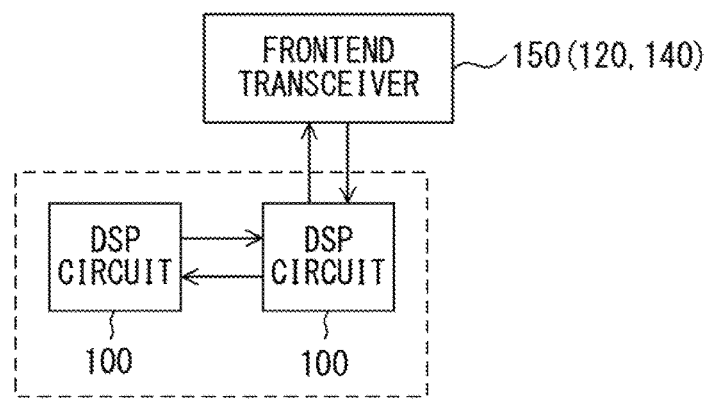
F I G. 1 2 B
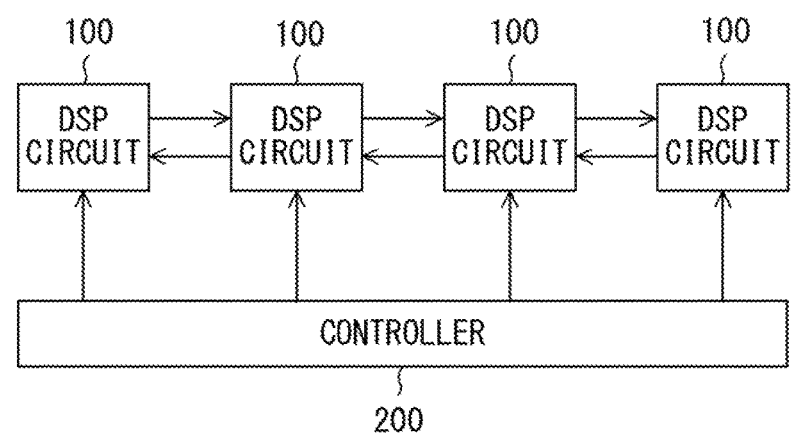

DIGITAL SIGNAL PROCESSING CIRCUIT AND SIGNAL PROCESSING DEVICE THAT INCLUDES A PLURALITY OF DIGITAL SIGNAL PROCESSING CIRCUITS

CROSS-REFERENCE TO RELATED APPLICATION

This application is based upon and claims the benefit of priority of the prior Japanese Patent Application No. 2016-085785, filed on Apr. 22, 2016, the entire contents of which are incorporated herein by reference.

FIELD

The embodiments discussed herein are related to a digital signal processing circuit and a signal processing device that includes a plurality of digital signal processing circuits used in optical communications.

BACKGROUND

In recent years, transceivers used in optical communications have often included a digital signal processing circuit. As an example, a receiver front end circuit generates an electric field information signal indicating electric field information of a received optical signal. The digital signal processing circuit recovers data from the electric field information signal. In addition, the digital signal processing circuit generates an electric field information signal indicating electric field information of an optical signal from client data according to a modulation scheme. A transmitter frontend circuit generates a modulated optical signal according to the electric field information signal.

On the other hand, functions and/or performances (hereinafter simply referred to as "functions") that are requested in a communication system differ according to an application. As an example, quality, capacity, transmission distance, spectrum utilization efficiency, and the like are requested for each user. These requests can be achieved by a digital signal processing circuit included in a transceiver. As an example, large-capacity transmission (or long-distance transmission) is achieved by using a digital signal processing circuit that provides high-performance error correction. In addition, long-distance transmission is achieved by using a digital signal processing circuit that provides high-performance dispersion compensation/non-linear compensation.

A technology relating to a signal processing circuit is described, for example, in Japanese Laid-open Patent Publication No. 63-221708 and Japanese Laid-open Patent Publication No. 6-112854.

Requests from all users can be satisfied by developing a digital signal processing circuit that provides all of the functions requested in a communication system. However, in this case, the circuit scale of the digital signal processing circuit increases, and therefore it may be difficult to design the circuit, and a manufacturing yield may deteriorate. Further, the power consumption of the digital signal processing circuit increases.

The problem above can be solved by developing a digital signal processing circuit that corresponds to each of the requested functions. However, in this case, plural types of digital signal processing circuits are developed, and therefore the total development time and the total development cost may increase.

SUMMARY

According to an aspect of the present invention, a signal processing device includes a plurality of digital signal processing circuits. Each of the plurality of digital signal processing circuits includes: a regeneration circuit configured to regenerate a bit stream from an electric field information signal that indicates an electric field of an optical signal; an error correction circuit configured to correct an error in the regenerated bit stream; an encoder circuit configured to add an error correction code to data so as to generate an encoded bit stream; and a generation circuit configured to generate an electric field information signal that indicates an electric field of an optical signal from the encoded bit stream. An electric field information signal or a bit stream is given from a regeneration circuit, an encoder circuit, a generation circuit, or any combination thereof implemented in a first digital signal processing circuit in the plurality of digital signal processing circuits to a second digital signal processing circuit in the plurality of digital signal processing circuits. A regeneration circuit, an error correction circuit, a generation circuit, or any combination thereof implemented in the second digital signal processing circuit processes the electric field information signal or the bit stream given from the first digital signal processing circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a digital signal processing circuit according to embodiments of the invention.

FIG. 6 illustrates an example of a signal processing device according to a third embodiment.

FIG. 7 illustrates an example of coherent detection performed by a receiver frontend circuit.

FIGS. 12A and 12B illustrate examples of a subsystem that includes a plurality of digital signal processing circuits.

DESCRIPTION OF EMBODIMENTS

Figure 2:
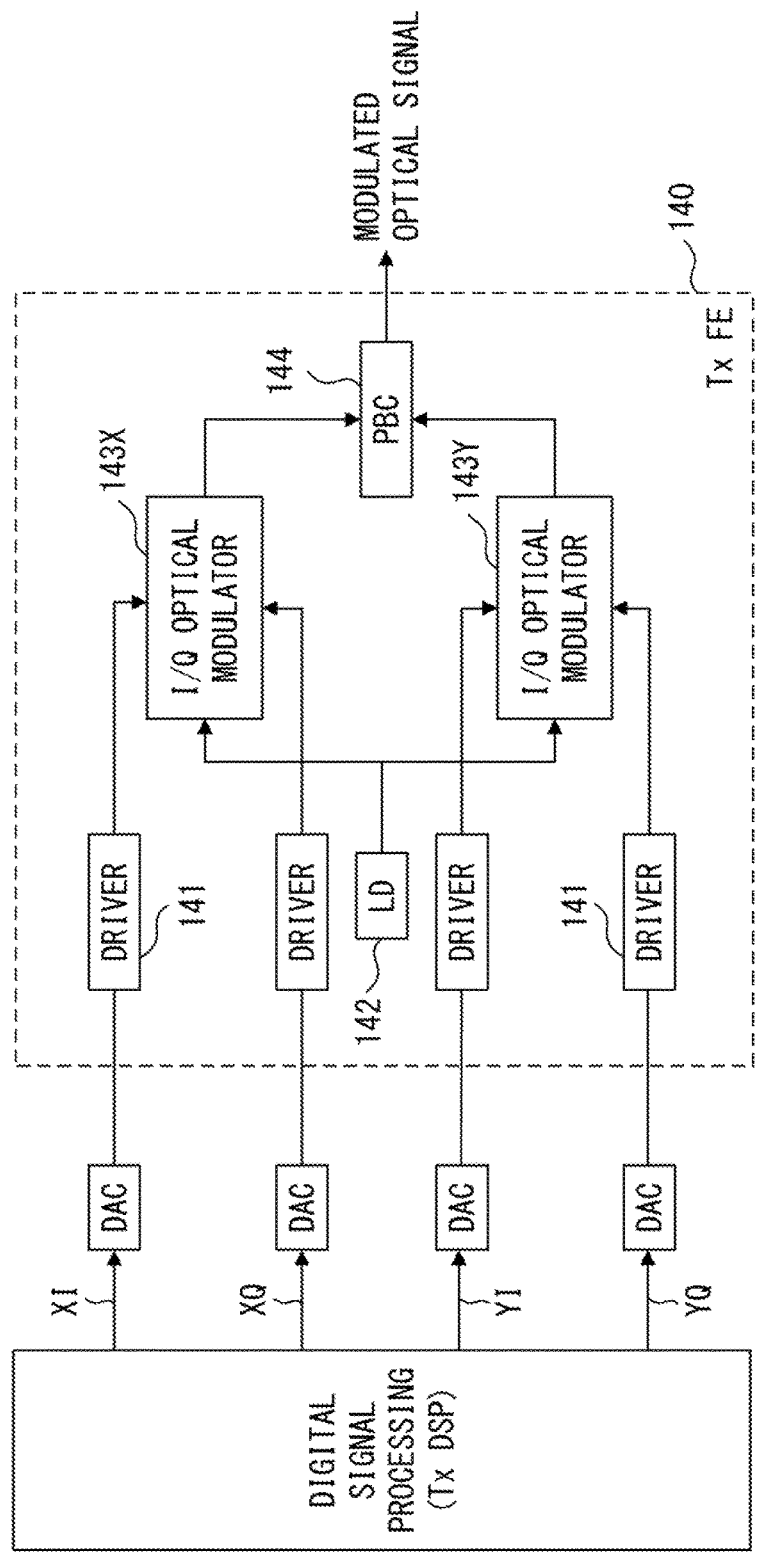
FIG. 2 illustrates an example of a transmitter frontend circuit.

FIG. 1 illustrates an example of a digital signal processing circuit according to embodiments of the invention. A digital signal processing circuit 100 according to the embodiments is used in optical communications. Specifically, the digital signal processing circuit 100 has a function of recovering data from an electric field information signal indicating electric field information of a received optical signal, and a function of generating an electric field information signal indicating electric field information of an optical signal from data.

The digital signal, processing circuit 100 includes an interface that connects the digital signal processing circuit 100 to a receiver frontend circuit (Rx_FF) 120 and a transmitter frontend circuit (Tx_FF) 140. The receiver frontend circuit 120 generates an electric field information signal indicating electric field information of a received optical signal. Accordingly, when the receiver frontend circuit 120 is connected to the digital signal processing circuit 100, the electric field information signal generated by the receiver frontend circuit 120 is input to the digital signal processing circuit 100. The transmitter frontend circuit 140 generates a modulated optical signal according to an electric field information signal. Accordingly, when the transmitter frontend circuit 140 is connected to the digital signal processing circuit 100, the digital signal processing circuit 100 generates an electric field information signal that is given to the transmitter frontend circuit 140.

The digital signal processing circuit 100 includes an analog-to-digital (A/D) converter (ADC) 1, a dispersion compensator (a chromatic dispersion compensator) (CDC) 2, a non-linear compensator (NLC) 3, an adaptive equalizer (AEQ) 4, a carrier frequency offset compensator/carrier phase recovery circuit (FOC/CPR) 5, an FEC decoder circuit 6, a client data transmitter (CL_Tx) 7, a client data receiver (CL_Rx) 11, an FEC encoder circuit 12, a mapper 13, and a digital-to-analog (D/A) converter (DAC) 14. The digital signal processing circuit 100 may include other circuit elements (namely, functions) that are not illustrated in FIG. 1.

The A/D converter 1 converts an electric field information signal generated by the receiver frontend circuit 120 into a digital signal. The dispersion compensator 2 performs a digital operation on the electric field information signal so as to compensate for chromatic dispersion. The non-linear compensator 3 performs a digital operation on the electric field information signal so as to compensate for non-linear distortion. Namely, an electric field information signal in which chromatic dispersion and non-linear distortion are compensated for is generated by the dispersion compensator 2 and the non-linear compensator 3. The digital signal processing circuit 100 may repeatedly perform compensation processing by using the dispersion compensator 2 and the non-linear compensator 3 plural times. In this case, compensation processing performed by the dispersion compensator 2 and compensation processing performed by the non-linear compensator 3 are performed alternately. The adaptive equalizer 4 equalizes the electric field information signal in which chromatic dispersion and non-linear distortion are compensated for. As an example, the adaptive equalizer 4 equalizes the amplitude, waveform distortion of the electric field information signal. At this time, the adaptive equalizer 4 can adaptively perform equalization of the amplitude, waveform distortion of the electric field information signal, and separation of a polarization multiplexed signal, while monitoring an input signal or an output signal of the adaptive equalizer 4. Each of the dispersion compensator 2, the non-linear compensator 3, and the adaptive equalizer 4 may be configured by a digital filter.

The carrier frequency offset compensator/carrier phase recovery circuit 5 recovers a symbol front the equalized electric field information signal. Specifically, the carrier frequency offset compensator/carrier phase recovery circuit 5 compensates for a frequency offset of the electric field information signal. The frequency offset represents a difference between an optical frequency of a carrier of a received optical signal and an optical frequency of a local light source of the receiver frontend circuit 120. The carrier frequency offset compensator/carrier phase recovery circuit 5 also recovers a phase of the carrier of the received optical signal. Namely, a difference between an optical phase of the carrier of the received optical signal and an optical phase of the local light source, and phase rotation on an optical transmission line, are compensated for, and a modulation phase is recovered. Consequently, the phase and amplitude of a received symbol are recovered. The carrier frequency offset compensator/carrier phase recovery circuit 5 recovers a bit stream according to the phase and amplitude of the received symbol in accordance with a specified modulation scheme. Namely, in this example, the carrier frequency offset compensator/carrier phase recovery circuit 5 has a demapping function for recovering a bit stream from a received symbol. As described above, the dispersion compensator (CDC) 2, the non-linear compensator (NLC) 3, the adaptive equalizer (AEQ) 4, and the carrier frequency offset compensator/carrier phase recovery circuit (FOC/CPR) 5 operate as a constellation regenerator that regenerates a bit stream from an electric field information signal that generated by the receiver frontend circuit 120 from a received optical signal.

The FEC decoder circuit 6 divides the regenerated bit stream into code words. Each of the code words includes data and an FEC. The FEC decoder circuit 6 corrects an error in data by using the FEC for each of the code words. Namely, data is recovered. The client data transmitter transmits the recovered data to a client.

The client data receiver 11 receives data generated by a client. The FEC encoder circuit 12 adds the FEC to client data so as to generate an encoded bit stream. The mapper 13 maps the encoded bit stream on a symbol according to a specified modulation scheme. Each of the symbols indicates a phase and amplitude. Stated another way, an electric field information signal indicating electric field information of an optical signal is generated by the mapper 13.

The D/A converter 14 converts the electric field information signal generated by the mapper 13 into an analog signal. Namely, an analog electric field information signal is generated. The analog electric field information signal is given to the transmitter frontend circuit 140. The transmitter frontend circuit 140 generates a modulated optical signal according to the analog electric field information signal.

A circuit including the dispersion compensator (CDC) 2, the non-linear compensator (NLC) 3, the adaptive equalizer (AEQ) 4, and the carrier frequency offset compensator/carrier phase recovery circuit (FOC/CPR) 5 is an example of a regeneration circuit. The FEC decoder circuit 6 is an example of an error correction circuit. The FEC encoder circuit 12 is an example of an encoder circuit. The mapper 13 is an example of a generation circuit.

FIG. 2 illustrates an example of the transmitter frontend circuit 140. The transmitter frontend circuit 140 includes drivers 141, a laser light source (ID) 142, I/Q optical modulators 143X and 143Y, and a polarization, beam combiner (PBC) 144 in this example. One set of electric field information signals XI, XQ, YI, and YQ generated by a digital signal processing circuit Tx_DSP is given to the transmitter frontend circuit 140. The digital signal processing circuit Tx_DSP and D/A converters (DACs) illustrated in FIG. 2 are implemented, for example, in the digital signal processing circuit 100 illustrated in FIG. 1.

The drivers 141 respectively generate drive signals XI, XQ, YI, and YQ from the electric field information signals XI, XQ, YI, and YQ. The laser light source 142 generates signal light having a specified frequency. The signal light is continuous wave light. The I/Q optical modulator 143X modulates the signal light by using the drive signals XI and XQ so as to generate a modulated optical signal X. Similarly, the I/Q optical modulator 143Y modulates the signal light by using the drive signals YI and YQ so as to generate a modulated optical signal Y. The polarization beam combiner 144 combines the modulated optical signals X and Y so as to generate a polarization, multiplexed modulated optical signal. Namely, the transmitter frontend circuit 140 can generate a polarization multiplexed modulated optical signal according to the electric field information signals XI, XQ, YI, and YQ.

Figure 3:
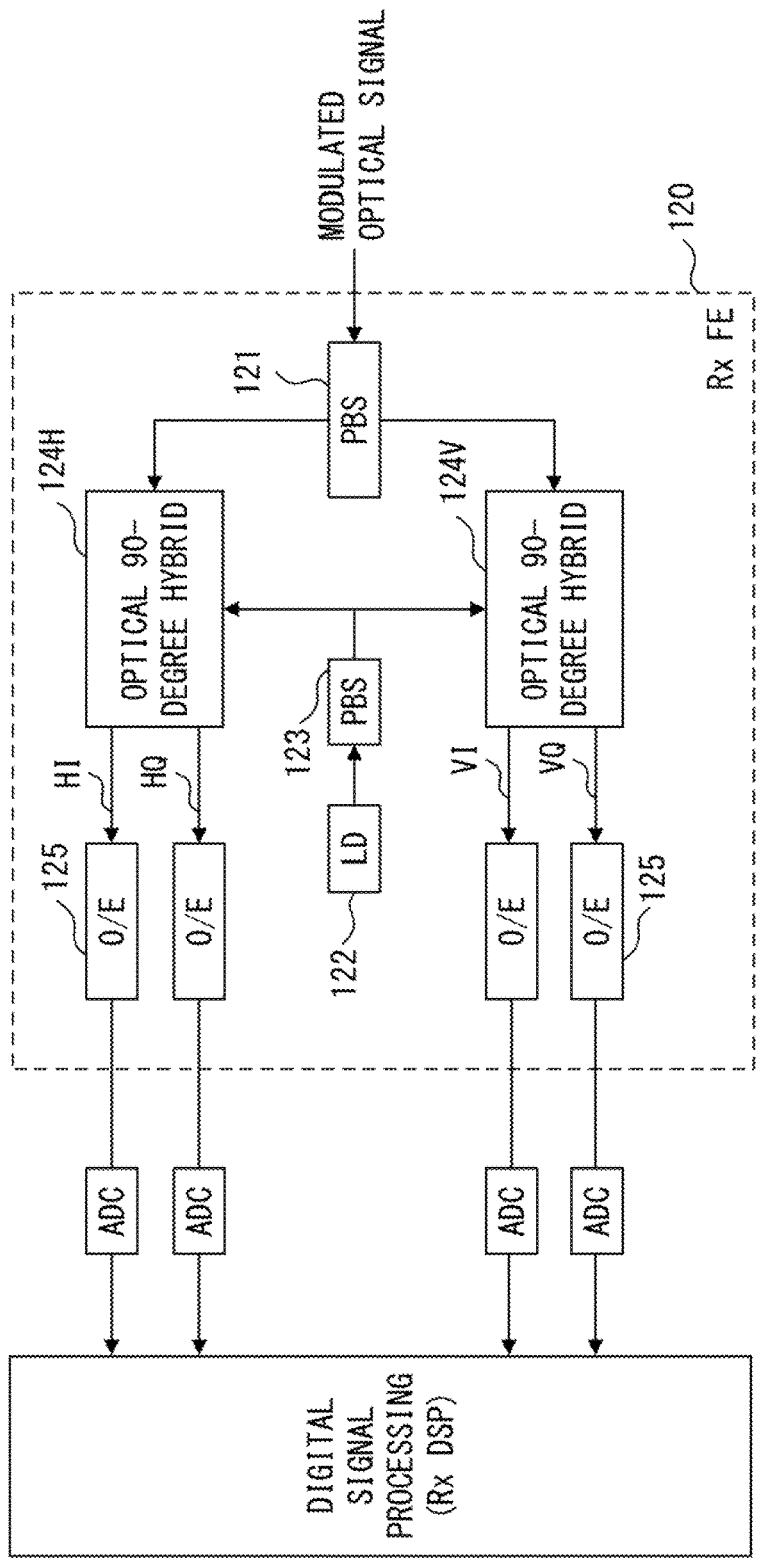
FIG. 3 illustrates an example of a receiver frontend circuit.

FIG. 3 illustrates an example of the receiver frontend circuit 120. The receiver frontend circuit 120 includes a polarization beam splitter (PBS) 121, a laser light source (LD) 122, a polarization beam splitter (PBS) 123, optical 90-degree hybrid circuits 124H and 124V, and optical-to-electric (O/E) converters 125 in this example. The receiver frontend circuit 120 receives a polarization multiplexed modulated optical signal via an optical fiber transmission line.

The polarization beam splitter 121 splits the received polarization multiplexed modulated optical signal into an optical signal H and an optical signal V. Polarizations of the optical signal H and the optical signal V are orthogonal to each other. The laser light source 122 generates local oscillation light. The local oscillation light is continuous wave light. The frequency of the local oscillation light generated by the laser light source 122 is almost the same as the optical frequency of a carrier of the received polarization multiplexed modulated optical signal. The polarization beam splitter 123 generates local oscillation light H and local oscillation light V from the local oscillation light that is output from the laser light source 122. Polarizations of the local oscillation light H and the local oscillation light V are orthogonal to each other. The optical 90-degree hybrid circuit 124H generates optical signals HI and HQ from the optical signal H by using the local oscillation light H. Similarly, the optical 90-degree hybrid circuit 124V generates optical signals VI and VQ from the optical signal V by using the local oscillation light V. The O/E converters 125 respectively convert the optical signals HI, HQ, VI, and VQ into electric signals HI, HQ, VI, and VQ. Stated another way, the receiver frontend circuit 120 generates an electric field information signal indicating electric field information of the received polarization multiplexed modulated optical signal.

The electric field information signal generated by the receiver frontend circuit 120 is guided to the digital signal processing circuit Rx_DSP via the A/D converters (ADCs). The digital signal processing circuit Rx_DSP recovers data from the electric field information signal. The digital signal processing circuit. Rx_DSP and the A/D converters illustrated in FIG. 3 are implemented, for example, in the digital signal processing circuit 100 illustrated in FIG. 1.

As described above, the digital signal processing circuit 100 receives an electric field information signal generated by the receiver frontend circuit 120. The digital signal processing circuit 100 recovers data from the electric field information signal. The digital signal processing circuit 100 generates an electric field information signal from client data, and gives the electric field information signal to the transmitter frontend circuit 140. The transmitter frontend circuit 140 generates a modulated optical signal according to the electric field information signal. Namely, the digital signal processing circuit 100 can perform signal processing for optical communications.

The digital signal processing circuit 100 can perform signal processing for optical communications in cooperation with another digital signal processing circuit 100. Namely, a plurality of digital signal processing circuits 100 can perform signal processing for optical communications in cooperation with each other. Accordingly, the digital signal processing circuit 100 includes an interface used to operate in cooperation with another digital signal processing circuit 100. Specifically, the digital signal processing circuit 100 includes switches (SWs) 21-26 and interface ports IF1-IF6, as illustrated in FIG. 1.

The switch 21 selects one of an output signal of the A/D converter 1 and an input signal of the interface port IF1, and guides the selected signal to the dispersion compensator 2. The switch 22 guides an electric field information signal that is output from a compensator circuit (the dispersion compensator 2 and the non-linear compensator 3), to the adaptive equalizer 4 or the interface port IF6. The switch 23 guides an output signal of the carrier frequency offset compensator/carrier phase recovery circuit 5 to the switch 24 or the interface port IF2. Note that the switch 23 can also distribute the output signal of the carrier frequency offset compensator/carrier phase recovery circuit 5 to the switch 24 and the interface port IF2 in time division multiplexing. The switch 24 selects one of an output signal of the switch 23 and an input signal of the interface port IF5, and guides the selected signal to the FEC decoder circuit 6.

The switch 25 guides an output signal of the FEC encoder circuit 11 to the switch 26 or the interface port IF4. The switch 26 selects one of an output signal of the switch 25 and an input signal of the interface port IF3, and guides the selected signal to the mapper 13. Note that the switch 26 can also multiplex the output signal of the switch 25 and the input signal of the interface port IF3, and can guide the multiplexed signal to the mapper 13. The states of the switches 21-26 are specified in advance, for example, by a vendor or a user.

A processed signal that has been generated in another digital signal processing circuit 100 is input to the interface port IF1. As an example, an electric field information signal in which chromatic dispersion and non-linear distortion have been compensated for by another digital signal processing circuit 100 is input to the interface port IF1. The interface port IF2 outputs a bit stream that is generated by the carrier frequency offset compensator/carrier phase recovery circuit 5. Note that the interface port IF2 can also output an electric field information signal that is being processed by the carrier frequency offset compensator/carrier phase recovery circuit 5. An encoded bit stream generated in another digital signal processing circuit 100 is input to the interface port IF3.

The interface port IF4 outputs an encoded bit stream generated by the FEC encoder circuit 12. A bit stream generated by the carrier frequency offset compensator/carrier phase recovery circuit 5 of another digital signal processing circuit 100 is input to the interface port IF5. The interface port IF6 outputs an electric field information signal in which at least one of chromatic dispersion and non-linear distortion has been compensated for by a compensator circuit (the dispersion compensator 2 and the non-linear compensator 3).

As described above, the digital signal processing circuit 100 includes an interface that transmits a signal that is being processed in the digital signal processing circuit 100 to another digital signal processing circuit. In addition, the digital signal processing circuit 100 includes an interface that receives a signal that is being processed in another digital signal processing circuit.

First Embodiment

Figure 4:
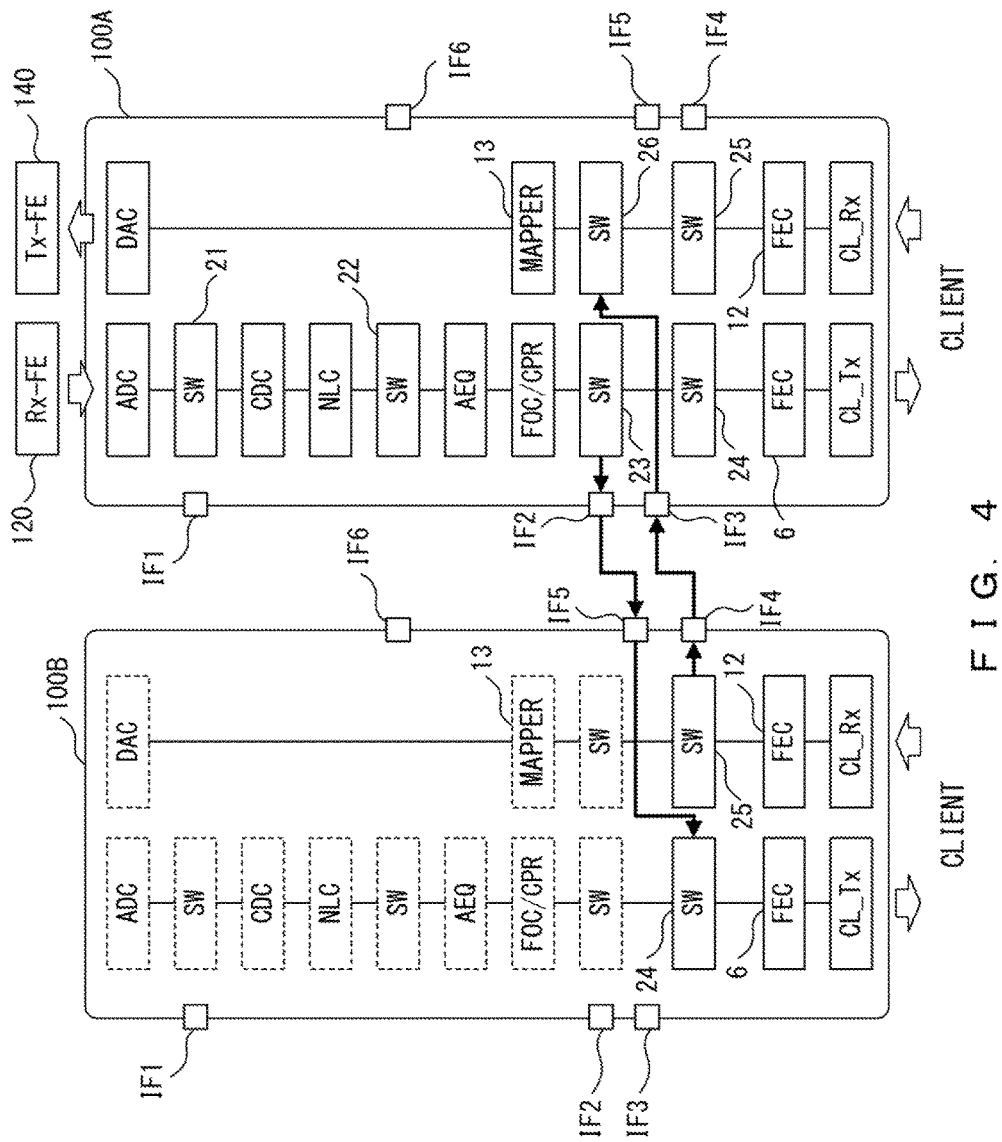
FIG. 4 illustrates an example of a signal processing device according to a first embodiment.

FIG. 4 illustrates an example of a signal processing device according to a first embodiment. The signal processing device according to the first embodiment includes two digital signal processing circuits 100A and 100B. Each of the digital signal processing circuits 100A and 100B is realized by the digital signal processing circuit 100 illustrated in FIG. 1.

A receiver frontend circuit 120 and a transmitter front end circuit 140 are connected to the digital signal processing circuit 100A. However, the receiver frontend circuit 120 and the transmitter frontend circuit 140 are not connected to the digital signal processing circuit 100B.

In this example, in each of the digital signal processing circuits 100A and 100B, a data rate that an FEC circuit (an FEC decoder circuit 6 and an FEC encoder circuit 12) can process is half, of the data rate that a constellation processor (a dispersion compensator CDC, a non-linear compensator NLC, an adaptive equalizer AEQ, a carrier frequency offset compensator/carrier phase recovery circuit FOC/CPR, and a mapper 13) can process.

The digital signal processing circuit 100A is configured as described below. A switch 23 distributes an output signal of the carrier frequency offset compensator/carrier phase recovery circuit FOC/CPR to a switch 24 and an interface port IF2 in time division multiplexing. Namely, a bit stream regenerated from a received optical signal is distributed to the switch 24 and the interface port IF2. It is preferable that a data rate of a bit stream guided to the switch 24 and a data rate of a bit stream guided to the interface power IF2 be substantially the same as each other. In addition, a switch 26 multiplexes an output signal of a switch 25 and an input signal of an interface port IF3 in time division multiplexing, and guides the multiplexed signal to the mapper 13. Stated another way, an encoded bit stream generated in the digital signal processing circuit 100A and an encoded bit stream that is input via the interface port IF3 are multiplexed by the switch 26. It is preferable that a data rate of a bit stream guided, from the switch 25 to the switch 26 and a data rate of a bit stream guided from the interface port IF3 to the switch 26 be substantially the same as each other. The switches 21, 22, 24, and 25 process a signal as illustrated in FIG. 4.

The digital signal processing circuit 100B is configured as described below. A switch 24 guides an input signal of an interface port IF5 to an FEC decoder circuit 6. In addition, a switch 25 guides an output signal of an FEC encoder circuit 12 to an interface port IF4. A constellation processor (a dispersion compensator CDC, a non-linear compensator NLC, an adaptive equalizer AEQ, a carrier frequency offset compensator/carrier phase recovery circuit FOC/CPR, and a mapper 13) of the digital signal processing circuit 100B does not operate (is controlled to be in the OFF state). In FIG. 4, circuit elements that are controlled to be in the OFF state are illustrated with a broken line.

The interface port IF2 of the digital signal processing circuit 100A is connected to the interface port IF5 of the digital signal processing circuit 100B. In addition, the interface port IF4 of the digital signal processing circuit 100B is connected to the interface port IF3 of the digital signal processing circuit 100A.

In the signal processing device having the configuration above, an electric field information signal generated by the receiver frontend circuit 120 is given to the digital signal processing circuit 100A. In the digital signal processing circuit 100A, a bit stream is regenerated from the electric field information signal. The regenerated bit stream (namely, an output signal of the carrier frequency offset compensator/carrier phase recovery circuit FOC/CPR) is distributed to the switch 24 and the interface port IF2 by the switch 23. Consequently, half of the regenerated bit stream is guided to the FEC decoder circuit 6 of the digital signal processing circuit 100A, and the remaining half is guided to the FEC decoder circuit 6 of the digital signal processing circuit 100B.

The FEC decoder circuit 6 of each of the digital signal processing circuits 100A and 100B corrects an error in an input bit stream and recovers data. The recovered data is transmitted to a client.

In addition, each of the digital signal processing circuits 100A and 100B adds an FEC to data received from the client so as to generate an encoded bit stream. An encoded bit stream generated in the digital signal processing circuit 100B is guided to the switch 26 of the digital signal processing circuit 100A via the switch 25 of the digital signal processing circuit 100B, the interface port IF4 of the digital signal processing circuit 100B and the interface port IF3 of the digital signal processing circuit 100A. The switch 26 of the digital signal processing circuit 100A multiplexes an encoded bit stream generated in the digital signal processing circuit 100A and the encoded bit stream generated in the digital signal processing circuit 100B.

The multiplexed bit stream is mapped onto a symbol stream according to a specified modulation scheme by the mapper 13. Each of the symbols indicates electric field information of an optical signal to be transmitted. Namely, the mapper 13 generates an electric field information signal from the multiplexed bit stream. The electric field information signal is given to the transmitter frontend circuit 140. The transmitter frontend circuit 140 generates a modulated optical signal according to the electric field information signal.

As described, above, according to the first embodiment, the FEC circuits of the digital signal processing circuits 100A and 100B perform error correction processing in cooperation with each other. Accordingly, even when each of the FEC circuits has a small processing capacity, a large-capacity signal can be processed. As an example, in a case in which the processing capacity of the FEC circuit of each of the digital signal processing circuits 100A and 100B is 200 Gbps, the signal processing device illustrated in FIG. 4 can process a signal of 400 Gbps.

In a case in which a constellation generation/regeneration function and an FEC function are realized by a digital signal processing circuit, a circuit scale of the FEC function is likely to larger than a circuit scale of the constellation generation/regeneration function. In particular, the scale of the FEC decoder circuit 6 is large. Here, according to the first embodiment, by realizing the FEC function by using a plurality of digital signal processing circuits, the scale of an FEC circuit of each of the digital signal processing circuits can be reduced, and the size of the digital signal processing circuit, itself can be reduced. Stated another way, large-capacity signal processing can be achieved while suppressing development costs of the digital signal processing circuit.

In the example illustrated in FIG. 4, the signal processing device includes two digital signal processing circuits 100A and 100B, but the invention is not limited to this configuration. Namely, the signal processing device according to the first embodiment may be configured to include three or more digital signal processing circuits.

Second Embodiment

Figure 5:
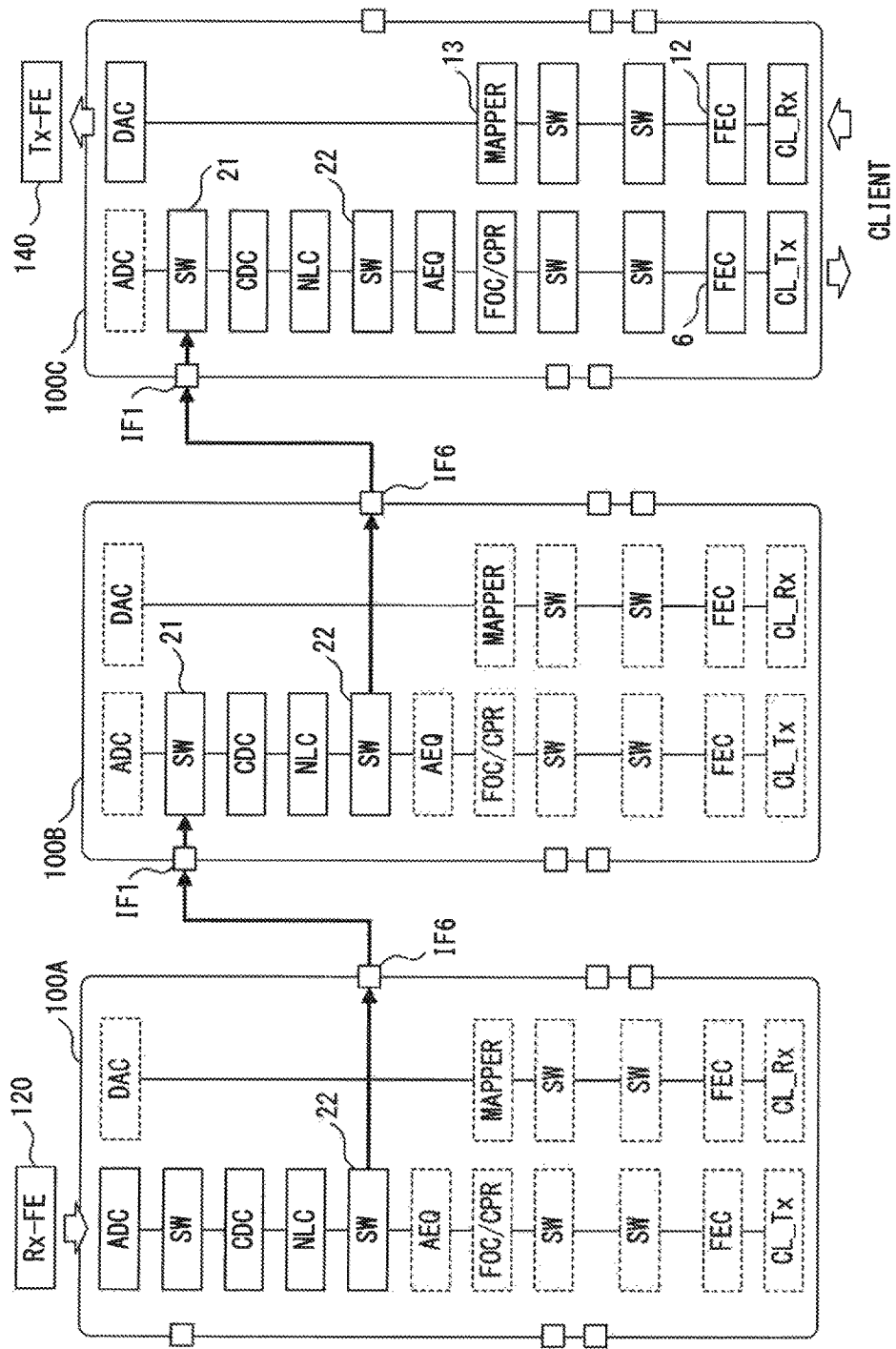
FIG. 5 illustrates an example of a signal processing device according to a second embodiment.

FIG. 5 illustrates an example of a signal processing device according to a second embodiment. The signal processing device according to the second embodiment includes three digital signal processing circuits 100A-100C. Each of the digital signal processing circuits 100A-100C is realized by the digital signal processing circuit 100 illustrated in FIG. 1.

A receiver frontend circuit 120 is connected to the digital signal processing circuit 100A. A transmitter frontend circuit 140 is connected to the digital signal processing circuit 100C.

The digital signal processing circuit 100A is configured as described below. A switch 22 guides an output signal of a compensator circuit (a dispersion compensator CDC and a non-linear compensator NLC) to an interface port IF6. Stated another way, an electric field information signal in which chromatic dispersion and non-linear distortion are compensated for is guided to the interface port IF6. The interface port IF6 of the digital signal processing circuit 100A is connected to an interface port IF1 of the digital signal processing circuit 100B.

The digital signal processing circuit 100B is configured as described below. A switch 21 guides an input signal of the inter-face port IF1 to a dispersion compensator CDC, A switch 22 guides an output signal of a compensator circuit (the dispersion compensator CDC and a non-linear compensator NLC) to an interface port IF6. The interface port IF6 of the digital signal processing circuit 100B is connected to an interface port IF1 of the digital signal processing circuit 100C.

The digital signal processing circuit 100C is configured as described below. A switch 21 guides an input signal of the interface port IF1 to a dispersion compensator CDC. A switch 22 guides an output signal of a compensator circuit (a dispersion compensator CDC and a non-linear compensator NLC) to an adaptive equalizer AEQ.

Other switches of the digital signal processing circuits 100A-100C process a signal as illustrated in FIG. 5. In FIG. 5, circuit elements illustrated with a broken line are controlled to be in the OFF state.

In the signal processing device having the configuration above, an electric field information signal generated by the receiver frontend circuit 120 is given to the digital signal processing circuit 100A. In the digital signal processing circuit 100A, chromatic dispersion is compensated for by the dispersion compensator CDC, and non-linear distortion is compensated for by the non-linear compensator NLC. Then, an electric field information signal in which chromatic dispersion and non-linear distortion are compensated for is guided to the digital signal processing circuit 100B by the switch 22.

Also in the digital signal processing circuit 100B, chromatic dispersion is compensated for by the dispersion compensator CDC, and non-linear distortion is compensated for by the non-linear compensator NLC. Then, an electric field information signal in which chromatic dispersion and non-linear distortion are compensated for is guided to the digital signal processing circuit 100C by the switch 22.

Also in the digital signal processing circuit 100C, chromatic dispersion is compensated for by the dispersion compensator CDC, and non-linear distortion is compensated for by the non-linear compensator NLC. However, in the digital signal processing circuit 100C, an output signal of the non-linear compensator NLC is guided to the adaptive equalizer AEQ in the digital signal processing circuit 100C by the switch 22. The adaptive equalizer AEQ equalizes an electric field information signal in which chromatic dispersion and non-linear distortion are compensated for, and a carrier frequency offset compensator/carrier phase recovery circuit FOC/CPR recovers a bit stream from the equalized electric field information signal. The other processing of the digital signal processing circuit 100C is the same as that of the digital signal processing circuit 100 illustrated in FIG. 1.

As described above, according to the second embodiment, the compensator circuits (the dispersion compensators CDC and the non-linear compensators NLC) of the plural digital signal processing circuits 100A-100C are cascade-connected. The leading compensator circuit (in the example illustrated in FIG. 5, a compensator circuit implemented in the digital signal processing circuit 100A) of the cascade-connected compensator circuits compensates for chromatic dispersion and non-linear distortion of an electric field information signal that is generated from a received optical signal in the receiver frontend circuit 120. Respective compensator circuits compensate for chromatic dispersion and non-linear distortion of an electric field information signal that is output from a pre-stage compensator circuit. In a digital signal processing circuit including a last-stage compensator circuit (in the example illustrated in FIG. 5, the digital signal processing circuit 100C), an FEC decoder circuit 6 corrects an error in a bit stream that is output form the carrier frequency offset compensator/carrier phase recovery circuit FOC/CPR.

When the number of processes performed by the dispersion compensator CDC and the non-linear compensator NLC increases, compensation performance is improved. When the compensation performance of chromatic dispersion and non-linear distortion is high, long-distance transmission of an optical signal can be performed. Accordingly, long-distance transmission of an optical signal can be achieved by making a plurality of digital signal processing circuits operate in cooperation with each other according to the second embodiment.

In the example illustrated in FIG. 5, the signal processing device includes three digital signal processing circuits 100A-100C, but the invention is not limited to this configuration. Namely, the signal processing device according to the second embodiment may include two digital signal processing circuits and may include four or more digital signal processing circuits. Note that the compensator circuit of each of the digital signal processing circuits may repeatedly perform compensation processing N times (N is an arbitrary integer).

Third Embodiment

FIG. 6 illustrates an example of a signal processing device according to a third embodiment. The signal processing device according to the third embodiment receives a wideband optical signal by using a plurality of digital signal processing circuits. In the example illustrated in FIG. 6, the signal processing device includes two digital signal processing circuits 100A and 100B. Each of the digital signal processing circuits 100A and 10033 is almost the same as the digital signal processing circuit 100 illustrated in FIG. 1. However, each of the digital signal processing circuits 100A and 100B has a dedicated function for the third embodiment, in addition to the digital signal processing circuit 100 illustrated in FIG. 1, as described later.

The signal processing device according to the third embodiment includes a plurality of receiver frontend circuits. In the example illustrated in FIG. 6, the signal processing device includes a receiver frontend circuit 120-1 (Rx_FE1) and a receiver frontend circuit 120-2 (Rx_FE2). The receiver frontend circuits 120-1 and 120-2 are respectively connected to the digital signal processing circuits 100A and 100B. A transmitter frontend circuit 140 is connected to the digital signal processing circuit 100B.

FIG. 7 illustrates an example of coherent detection performed by a receiver frontend circuit, in the example illustrated in FIG. 7, the center frequency of a received optical signal is $v_0$, and the bandwidth of the received optical signal is $BW_{sig}$. The receiver frontend circuit 120-1 generates an electric field information signal E1 indicating electric field information of the received optical signal by using local oscillation light having an optical frequency that is lower than $v_0$ (preferably, a frequency of $v_0-BW_{sig}/4$). In addition, the receiver frontend circuit 120-2 generates an electric field information signal E2 indicating electric field information of the received optical signal by using local oscillation light having an optical frequency that is higher than $v_0$ (preferably, a frequency of $v_0+BW_{sig}/4$). The signal processing device combines the electric field information signals E1 and E2 so as to obtain an electric field information signal of the entirety of the received optical signal.

In FIG. 7, a band Rx_FE1 illustrated with a broken line represents a frequency area in which the electric field information signal generated by the receiver frontend circuit 120-1 is converted into a digital signal by the A/D converter with higher precision. Similarly, a band Rx_FE2 illustrated with a broken line represents a frequency area in which the electric field information signal generated by the receiver frontend circuit 120-2 is converted into a digital signal by the A/D converter with higher precision. Stated another way, some signal components of the received optical signal are converted into an electric field information signal according to an output signal of the receiver frontend circuit 120-1 with higher precision, and the other signal components of the received optical signal are converted into an electric field information signal according to an output signal of the receiver frontend circuit 120-2 with higher precision. Accordingly, even when the bandwidth of a received optical signal is wide with respect to a bandwidth/speed limit of the A/D converter, a precise electric field information signal is generated.

Figure 8:
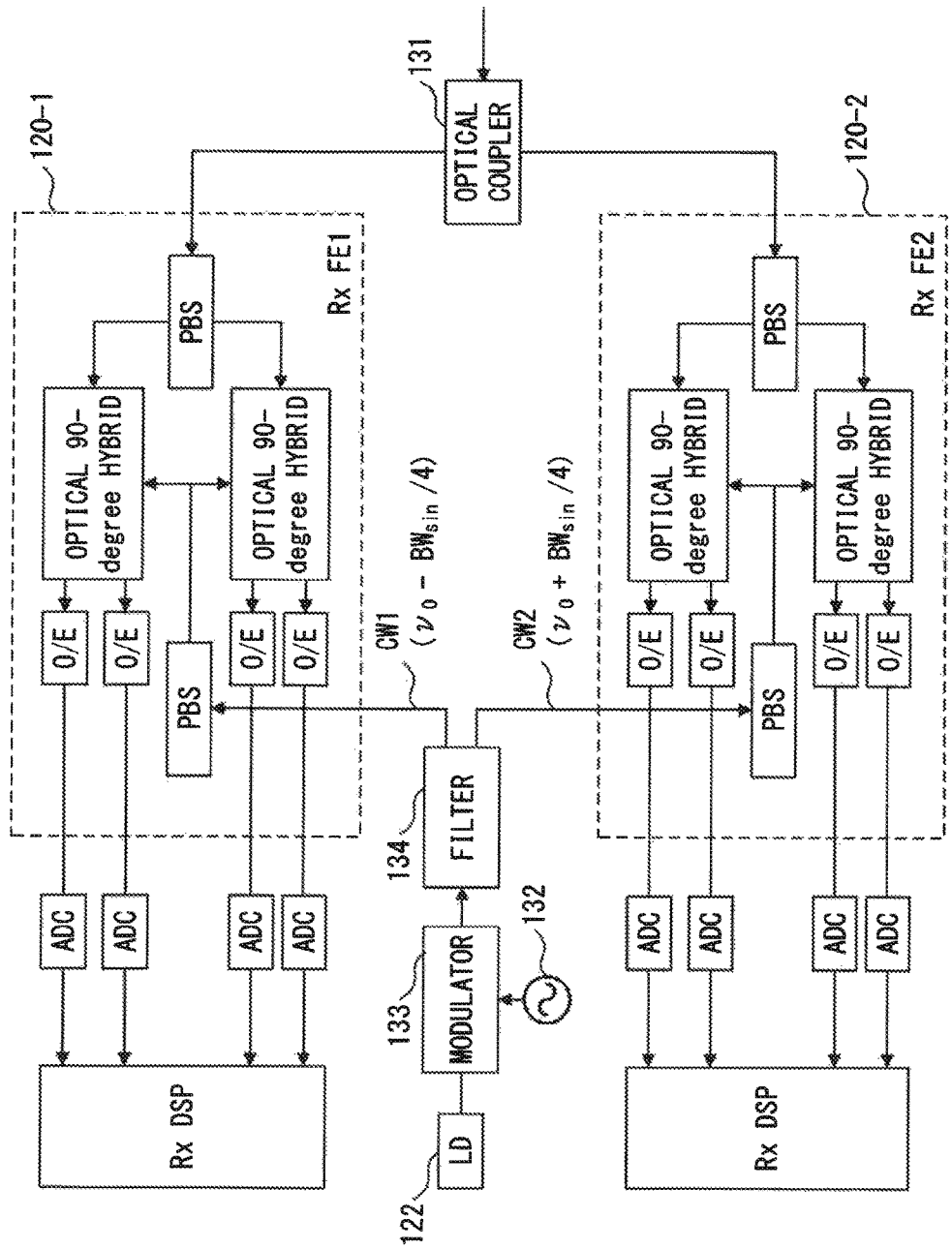
FIG. 8 illustrates an example of a receiver frontend circuit used in the third embodiment.

FIG. 8 illustrates an example of a receiver frontend circuit used according to the third embodiment. The receiver frontend circuit used in the signal processing device according to the third embodiment includes an optical coupler 131 and receiver frontend circuits 120-1 and 120-2. The optical coupler 131 splits and guides a received optical signal to the receiver frontend circuits 120-1 and 120-2. The powers of optical signals guided to the receiver frontend circuits 120-1 and 120-2 are substantially the same as each other. The respective configurations and operations of the receiver frontend circuits 120-1 and 120-2 are substantially the same as those of the receiver frontend circuit 120 illustrated in FIG. 3.

A laser light source 122, an electric oscillator 132, and an optical modulator 133 configure an optical comb generator. Namely, the electric oscillator 122 generates an electric signal of a specified frequency. This electric signal is, for example, a sine wave signal. The frequency $f_0$ of the electric signal is one-Mth of $BW_{sig}/4$. M is an arbitrary integer. The optical modulator 133 modulates local oscillation light generated by the laser light source 122 by using the electric signal generated by the electric oscillator 132 so as to generate an optical comb. The optical comb includes continuous wave light having an optical frequency of $v_0 \pm mf_0$ (m=0, 1, 2, . . . ). An optical filter 134 extracts continuous wave light CW1 having an optical frequency of $v_0-BW_{sig}/4$ and continuous wave light CW2 having an optical frequency of $v_0+BW_{sig}/4$. The continuous wave light CW1 is guided to the receiver frontend circuit 120-1, and the continuous wave light CW2 is guided to the receiver frontend circuit 120-2.

The receiver frontend circuit 120-1 performs coherent detection using the continuous wave light CW1 so as to generate an electric field information signal of the received optical signal. Similarly, the receiver frontend circuit 120-2 performs coherent detection using the continuous wave light CW2 so as to generate an electric field information signal of the received optical signal. Namely, the coherent detection illustrated in FIG. 7 is realized.

In the example illustrated in FIG. 8, the continuous wave light CW1 and the continuous wave light CW2 are generated by using the optical comb generator, but the third embodiment is not limited to this configuration. Namely, as an example, the continuous wave light CW1 and the continuous wave light CW2 may be generated by using two laser light sources. In this case, a circuit that synchronizes the phases of the continuous wave light CW1 and the continuous wave light CW2 with each other is needed.

Return now to the description of FIG. 6. Each of the digital signal processing circuits 100A and 100B includes a combiner 8 and an interface port IF7 in addition to the circuit elements illustrated in FIG. 1. The combiner 8 is provided between a compensator circuit (a dispersion compensator CDC and a non-linear compensator NLC) and an adaptive equalizer AEQ in this example. The combiner 8 combines an output signal of the switch 22 and an input signal of the interface port IF7. At this time, the combiner 8 may add the output signal of the switch 22 and the input signal of the interface port IF7 together in a frequency domain. The adaptive equalizer AEQ equalizes a combined signal generated by the combiner 8. The interface port IF7 can receive an output signal of another digital signal processing circuit. When an output signal of another digital signal processing circuit is not given to the interface port IF7, the combiner 8 is controlled to be in the OFF state.

The digital signal processing circuit 100A is configured as described below. A switch 22 guides an output signal of the compensator circuit (the dispersion compensator CDC and the non-linear compensator NLC) to an interface port IF6. The interface port IF6 is connected to the interface port IF7 of the digital signal processing circuit 100B.

The digital signal processing circuit 100B is configured as described below. A switch 22 guides an output signal of the compensator circuit (the dispersion, compensator CDC and the non-linear compensator NLC) to the combiner 3. The combiner 8 combines an electric field information signal that is output from the switch 22 with an electric field information signal that, is guided via the interface port IF7.

In the signal processing device having the configuration above, a received optical signal is guided to the receiver frontend circuits 120-1 and 120-2. Each of the receiver frontend circuits 120-1 and 120-2 generates an electric field information signal. Note that the receiver frontend circuits 120-1 and 120-2 generate electric field information signals by using local oscillation lights that have a different optical frequency from each other, as illustrated in FIG. 7 or FIG. 8.

The digital signal processing circuit 100A compensates for chromatic dispersion and non-linear distortion of the electric field information signal generated by the receiver frontend circuit 120-1. The electric field information signal in which chromatic dispersion and non-linear distortion have been compensated for is guided to the digital signal processing circuit 100B. The digital signal processing circuit 100B compensates for chromatic dispersion and non-linear distortion of the electric field information signal generated by the receiver frontend circuit 120-2.

In the digital signal processing circuit 100B, the combiner 8 combines two electric field information signals in which chromatic dispersion and non-linear distortion have been compensated for. The digital signal processing circuit 100B regenerates a bit stream from the combined signal and further corrects an error in the bit stream so as to recover data. Processing of generating an electric field information signal from client data is substantially the same in the first to third embodiments.

As described above, according to the third embodiment, a plurality of electric field information signals are generated by using local oscillation lights having a different optical frequency from each other, and the plurality of electric field information signals are combined. Accordingly, a signal processing device can receive a wide-band optical signal even when the operation speed of an A/D converter is not sufficiently high. Stated another way, a wide-band signal can be received by using a digital signal processing circuit installed with an inexpensive A/D converter. In addition, a high-frequency component is removed by combining a plurality of electric field information signals, and therefore the influence of noise is suppressed, and the qualify of a regenerated bit stream is improved.

Forth Embodiment

Figure 9:
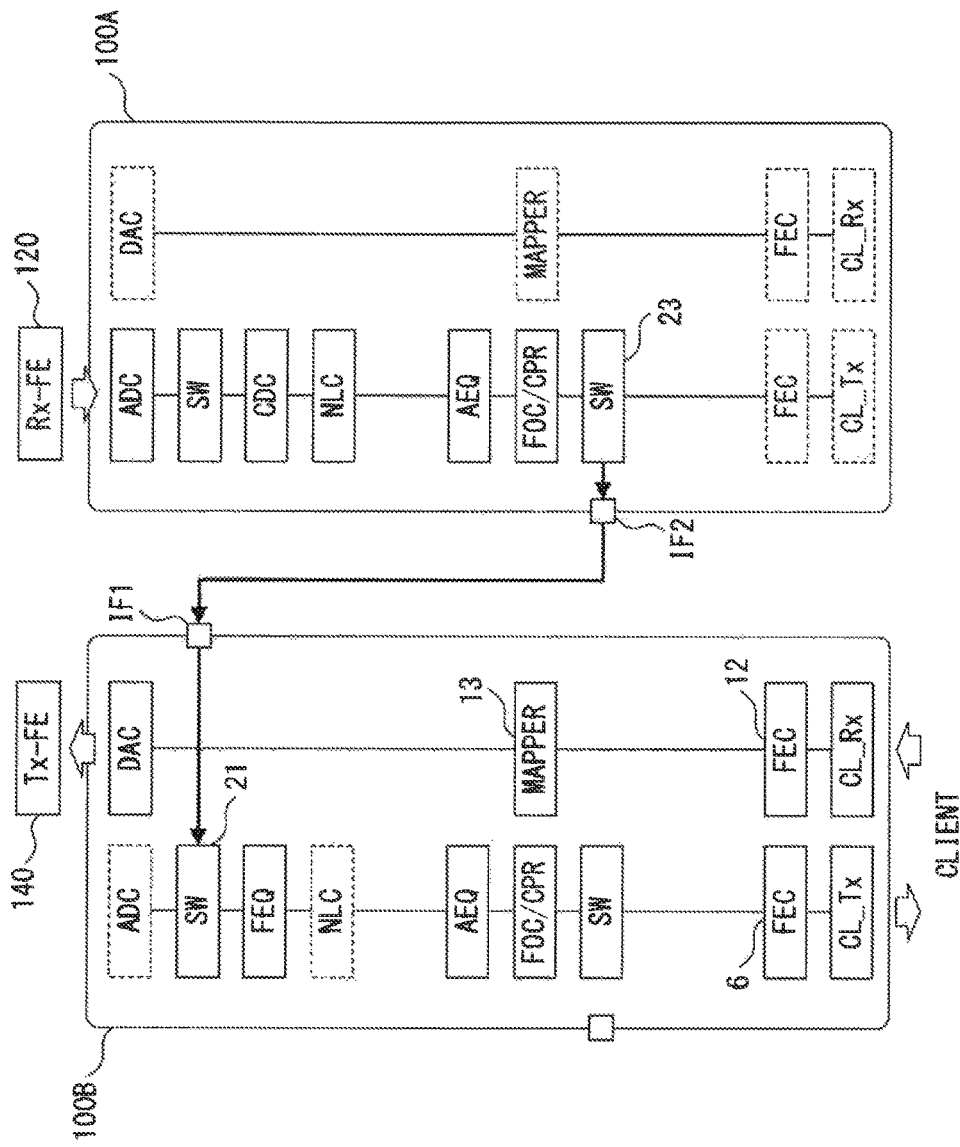
FIG. 9 illustrates an example of a signal processing device according to a fourth embodiment.

FIG. 9 illustrates an example of a signal processing device according to a fourth embodiment. The signal processing device according to the fourth embodiment includes two digital signal processing devices 100A and 100B. Each of the digital signal processing circuits 100A and 100B is realized by the digital signal processing circuit 100 illustrated in FIG. 1.

A receiver frontend circuit 120 is connected to the digital signal processing circuit 100A. A transmitter frontend circuit 140 is connected to the digital signal processing circuit 100B.

The hardware configurations of the digital signal processing circuits 100A and 100B are substantially the same as each other. However, the digital signal processing circuit 100B includes a fixed equalizer (FEQ) instead of a dispersion compensator CDC implemented in the digital signal processing circuit 100A. The fixed equalizer FEQ can compensate for distortion generated in the receiver frontend circuit 120 with high precision.

Each of the dispersion compensator CDC and the fixed equalizer FEQ may be realized by a digital filter. Thus the hardware configuration of a digital filter that realizes the fixed equalizer FEQ may be substantially the same as that of a digital filter that realizes the dispersion compensator CDC. However, filter coefficients for realizing the fixed equalizer FEQ are different from filter coefficients for realizing the dispersion compensator CDC. In other words, the dispersion compensator CDC is implemented in the digital signal processing circuit 100A by setting the filter coefficients for realizing the dispersion compensator CDC in the digital filter of the digital signal processing circuit 100A. In addition, the fixed equalizer FEQ is implemented in the digital signal processing circuit 100B by setting the filter coefficients for realizing the fixed equalizer FEQ in the digital filter of the digital signal processing circuit 100B.

The digital signal processing circuit 100A is configured as described below. A switch 23 guides an output signal of a carrier frequency offset compensator/carrier phase recovery circuit FOC/CPR to an interface port IF2. The interface port IF2 is connected to an interface port IF1 of the digital signal processing circuit 100B.

The digital signal processing circuit 100B is configured as described below. A switch 21 guides an input signal of the interface port IF1 to the fixed equalizer FEQ. A non-linear compensator NLC is controlled to be in the OFF state.

In the signal processing device having the configuration above, an electric field information signal generated by the receiver frontend circuit 120 is given to the digital signal processing circuit 100A. In the digital signal processing circuit 100A, chromatic dispersion is compensated for by the dispersion compensator CDC, and non-linear distortion is compensated for by the non-linear compensator NLC. Further, the electric field information signal is equalized by the adaptive equalizer AEQ, and provisional constellation decoding is performed by the carrier frequency offset compensator/carrier phase recovery circuit FOC/CPR. Here, in the digital signal processing circuit 100A, the carrier frequency offset compensator/carrier phase recovery circuit FOC/CPR compensates for a frequency offset and recovers a carrier phase, but does not perform demapping from an electric field information signal to a bit stream. Namely, in the digital signal processing circuit 100A, an electric field information signal in which a frequency offset has been compensated for and a carrier phase has been recovered is generated by the carrier frequency offset compensator/carrier phase recovery circuit FOC/CPR. Then this electric field information signal is guided to the digital signal processing circuit 100B by the switch 23.

In the digital signal processing circuit 100B, the electric field information signal given from the digital signal processing circuit 100A is guided to the fixed equalizer FEQ via the interface port IF1 and the switch 21. The fixed equalizer FEQ equalizes the electric field information signal. Here, a digital filter used as the fixed equalizer FEQ has a large number of taps (namely, a long memory length). Therefore, the fixed equalizer FEQ can compensate for distortion generated in the receiver frontend circuit 120 with high precision. Then, an electric field information signal that is output from the fixed equalizer FEQ is processed by the adaptive equalizer AEQ and the carrier frequency offset compensator/carrier phase recovery circuit FOC/CPR, and is converted into a bit stream. An error in the bit stream is corrected by the FEC decoder circuit 6.

As described above, in the signal processing device according to the fourth embodiment, an electric field information signal in which a frequency offset has been compensated for and a carrier phase has been recovered is equalized by a fixed equalizer FEQ having a large tap coefficient, and thus reception performance is improved. The hardware configurations of the digital signal processing circuits 100A and 100B are substantially the same as each other. Namely, the digital signal processing circuits 100A and 100B are realized by appropriately setting filter coefficients. Accordingly, development costs of digital signal processing circuits are suppressed.

Fifth Embodiment

Figure 10:
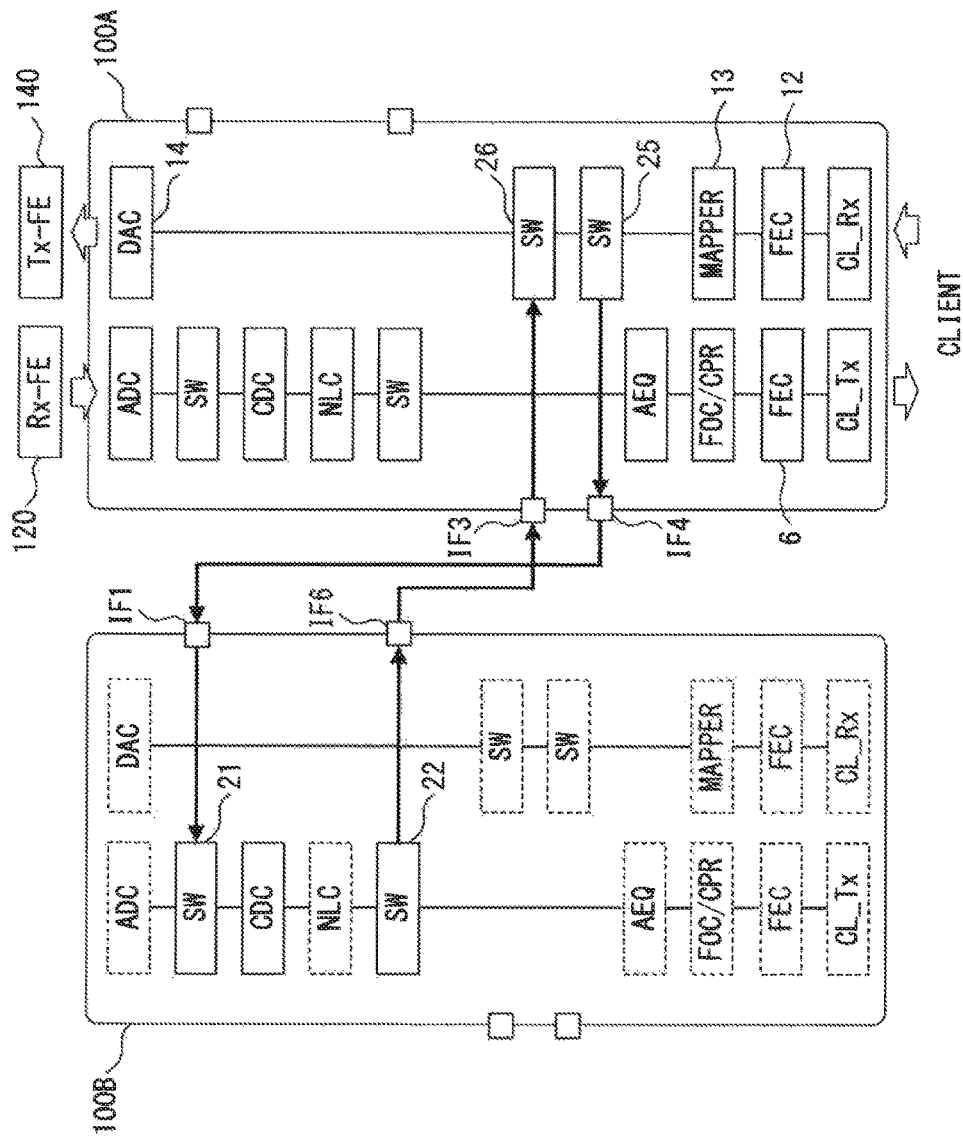
FIG. 10 illustrates an example of a signal processing device according to a fifth embodiment.

FIG. 10 illustrates an example of a signal processing device according to a fifth embodiment. The signal processing device according to the fifth embodiment includes two digital signal processing circuits 100A and 100B. Each of the digital signal processing circuits 100A and 100B is realized by the digital signal processing circuit 100 illustrated in FIG. 1. However, according to the fifth embodiment, switches 25 and 26 are provided on an output side of a mapper 13. Namely, the switch 25 guides an output signal of the mapper 13 to the switch 26 or an interface port IF4. The switch 26 selects one of an output signal of the switch 25 and an input signal of an interface port IF3, and guides the selected, signal to a D/A converter 14.

The digital signal, processing circuit 100A is configured as described below. The switch 25 guides an output signal of the mapper 13 to the interface port IF4. The interface port IF4 is connected to an interface port IF1 of the digital signal processing circuit 100B. The switch 26 selects an input signal of the interface port IF3, and guides the input signal to the D/A converter 14.

The digital signal processing circuit 100B is configured as described below. A switch 21 guides an input signal of the interface port IF1 to a dispersion compensator CDC. A non-linear compensator NLC is controlled to be in the OFF state. A switch 22 guides an output signal of the dispersion compensator CDC to an interface port IF6. The interface port IF6 is connected to the interface port IF3 of the digital signal processing circuit 100A.

In the signal processing device having the configuration above, data generated by a client is received by the digital signal processing circuit 100A. In the digital signal processing circuit 100A, an FEC encoder circuit 12 adds an FEC to the client data so as to generate an encoded bit stream, and the mapper 13 generates an electric field information signal from the encoded bit stream. The electric field information signal is guided to the digital signal processing circuit 100B by the switch 25.

In the digital signal processing circuit 100B, the electric field information signal given from the digital signal processing circuit 100A is guided to the dispersion, compensator CDC. The dispersion compensator CDC performs pre-compensation on the given electric field information signal. At this time, pre-compensation is performed, for example, according to a characteristic of an optical fiber transmission line between the signal processing device illustrated in FIG. 10 and a destination node. In this case, filter coefficients of a digital filter that configures the dispersion compensator CDC are specified in such a way that chromatic dispersion of a received optical signal in the destination node is suppressed. The switch 22 guides the electric field information signal on which pre-compensation has been performed to the digital signal processing circuit 100A.

In the digital signal processing circuit 100A, the electric field information signal given from the digital signal processing circuit 100B is guided to the D/A converter 14 by the switch 26. Namely, the digital signal processing circuit 100A gives the electric field information signal on which pre-compensation has been performed in the digital signal processing circuit 100B to the transmitter frontend circuit 140. Accordingly, an optical signal on which pre-compensation has been performed is generated.

As described above, according to the fifth embodiment, pre-compensation of an optical signal is achieved by causing a plurality of digital signal processing circuits to cooperate with each other. Accordingly, chromatic dispersion of the optical signal is suppressed without adding a dedicated circuit for pre-compensation.

Sixth Embodiment

Figure 11:
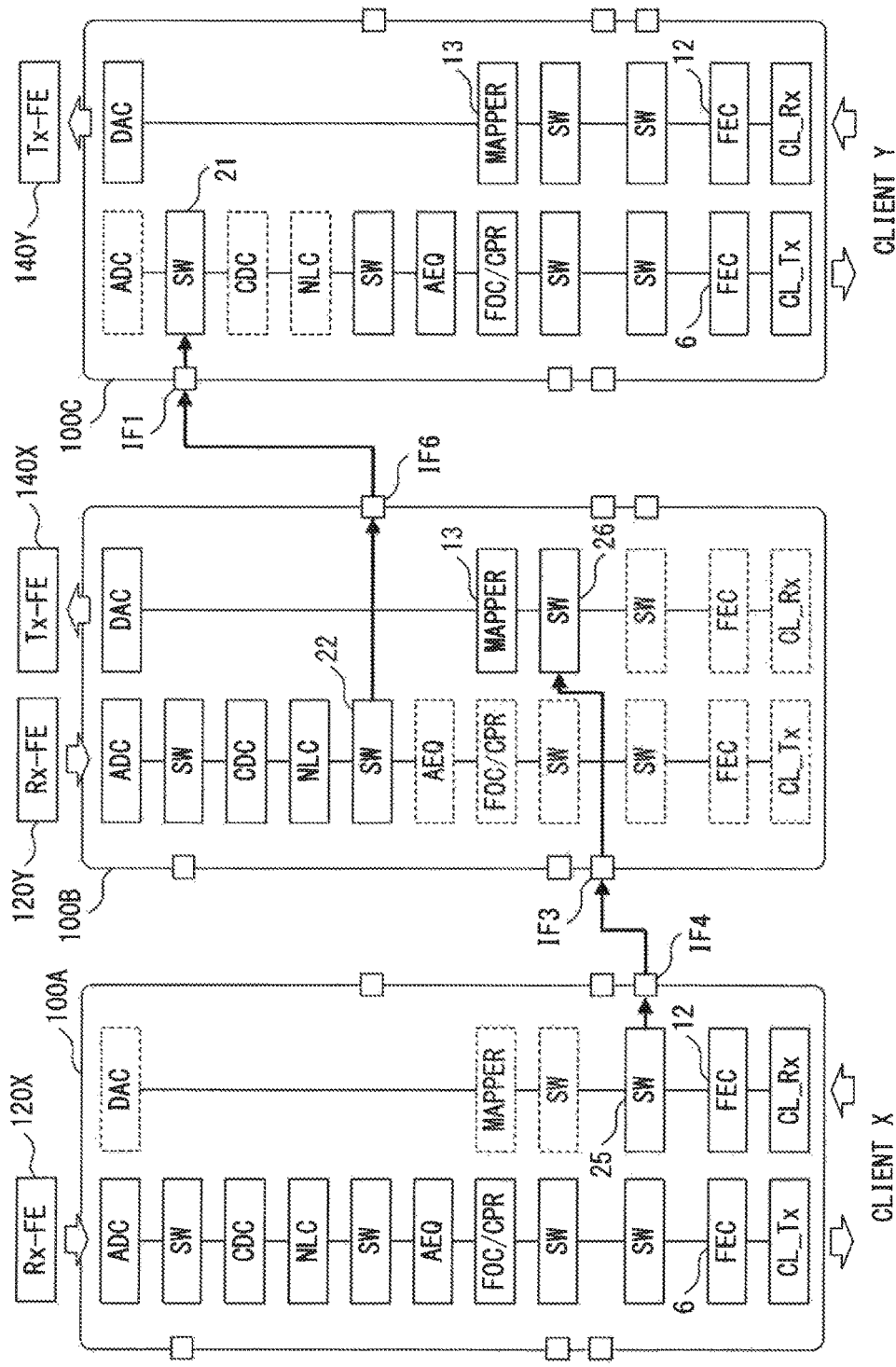
FIG. 11 illustrates an example of a signal processing device according to a sixth embodiment.

FIG. 11 illustrates an example of a signal processing device according to a sixth embodiment. Plural sets of optical transceivers are connected to the signal processing device according to the sixth embodiment. In the example illustrated in FIG. 11, two sets of optical transceivers are connected, to the signal processing device. Each of the optical transceiver includes a receiver frontend circuit and a transmitter frontend circuit.

A plurality of receiver frontend circuits may be implemented in one module, and a plurality of transmitter frontend circuits may be implemented in one module. In the example illustrated in FIG. 11, it is assumed that two receiver frontend circuits 120X and 120Y are implemented in one module, and that two transmitter frontend circuits 140X and 140Y are implemented in one module.

The signal processing device according to the sixth embodiment includes three digital signal processing circuits 100A-100C. Each of the digital signal processing circuits 100A-100C is realized by the digital signal processing circuit 100 illustrated in FIG. 1.

The receiver frontend circuits 120X and 120Y are respectively connected to the digital signal processing circuits 100A and 100B. The transmitter frontend circuits 140X and 140Y are respectively connected to the digital signal processing circuits 100B and 100C. A client X is accommodated in the digital signal processing circuit 100A, and a client Y is accommodated in the digital signal processing circuit 100C.

The digital signal processing circuit 100A is configured as described below. A switch 25 guides an encoded bit stream generated by an FEC encoder circuit 12 to an interface port IF4. The interface port IF4 is connected to an interface port IF3 of the digital signal processing circuit 100B.

The digital signal processing circuit 100B is configured as described below. A switch 26 guides an input signal of the interface port IF3 to a mapper 13. A switch 22 guides an output signal of a compensator circuit (a dispersion compensator CDC and a non-linear compensator NLC) to an interface port IF6. The interface port IF6 is connected to an interface port IF1 of the digital signal processing circuit 100C.

The digital signal processing circuit 100C is configured as described below. A switch 21 guides an input signal of the interface port IF1 to a dispersion compensator CDC. However, in this example, the dispersion compensator CDC and a non-linear distortion compensator NLC are controlled to be in the OFF state. Accordingly, the input signal of the interface port IF1 is substantially guided to an adaptive equalizer AEQ by the switch 21.

In the signal processing device having the configuration, above, data generated by the client X is encoded in the digital signal processing circuit 100A. An encoded bit stream generated in the digital signal processing circuit 100A is forwarded to the digital signal processing circuit 100B. In the digital signal processing circuit 100B, the mapper 13 generates an electric field information signal from the encoded bit stream received from the digital signal processing circuit 100A. The electric field information signal is given to the transmitter frontend circuit 140X. Accordingly, the data generated by the client X is transmitted by using the transmitter frontend circuit 140X. Data generated by the client Y is processed in the digital signal processing circuit 100C, and is transmitted by using the transmitter frontend circuit 140Y.

The receiver frontend circuit 120Y gives an electric field information signal indicating a received optical signal to the digital signal processing circuit 100B. In the digital signal processing circuit 100B, chromatic dispersion and non-linear distortion of the electric field information signal are compensated for. The electric field information, signal in which chromatic dispersion and non-linear distortion have been compensated for is forwarded to the digital signal processing circuit 100C. In the digital signal processing circuit 100C, data is recovered from the electric field information signal given from the digital signal processing circuit 100B. The recovered data is transmitted to the client Y. An electric field information signal generated by the receiver frontend circuit 120X is processed in the digital signal processing circuit 100A, and recovered data is transmitted to the client X.

As described above, according to the sixth embodiment, in a case in which a plurality of clients are accommodated by using a plurality of digital signal processing circuits, client data can be transmitted and received via a desired digital signal processing circuit. Accordingly, even when the arrangement of a receiver frontend circuit and a transmitter frontend circuit is specified in advance, a wire between the digital signal processing circuit and the receiver frontend circuit/transmitter frontend circuit can be shortened. Consequently, a signal waveform is suppressed from deteriorating.

In the example illustrated in FIG. 11, an electric field information signal in which chromatic dispersion and non-linear distortion have been compensated for is transmitted from the digital signal processing circuit 100B to the digital signal processing circuit 100C, and following processes are performed in the digital signal processing circuit 100C. However, the sixth embodiment is not limited to this configuration. As an example, the digital signal processing circuit 100B may regenerate a bit stream from an electric field information signal, and may forward the regenerated bit stream to the digital signal processing circuit 100C. In this case, the digital signal processing circuit 100C corrects an error in the regenerated bit stream received from the digital signal processing circuit 100B so as to recover data.

<Subsystem>

A signal processing device is configured by implementing a plurality of digital signal processing circuits 100 in one module, as illustrated in FIG. 12A, for example. In this case, the module is implemented in a motherboard of an optical transmission device. Alternatively, one digital signal processing circuit 100 may be implemented in one module. In this case, a plurality of digital signal processing circuits 100 and a controller 200 are implemented in a motherboard of an optical transmission device, as illustrated in FIG. 12B, for example. The controller 200 instructs settings of each of the digital signal processing circuits 100 according to an instruction from a network administrator or a user. As an example, the controller 200 can control settings of the switches 21-26 of each of the digital signal processing circuits 100.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A signal processing device that includes a plurality of digital signal processing circuits, each of the plurality of digital signal processing circuits comprising:

a regeneration circuit configured to regenerate a bit stream from an electric field information signal that indicates an electric field of an optical signal;

an error correction circuit configured to correct an error in the regenerated bit stream;

an encoder circuit configured to add an error correction code to data so as to generate an encoded bit stream; and a generation circuit configured to generate an electric field information signal that indicates an electric field of an optical signal from the encoded bit stream, wherein a first regeneration circuit implemented in the first digital signal processing circuit regenerates a bit stream from an electric field information signal that is generated according to a received optical signal in a receiver frontend circuit, the first digital signal processing circuit distributes the bit stream regenerated by the first regeneration circuit to a first error correction circuit implemented in the first digital signal processing circuit and a second error correction circuit implemented in the second digital signal processing circuit, each of the first error correction circuit and the second error correction circuit corrects an error in the bit stream distributed from the first regeneration circuit, the first digital signal processing circuit multiplexes a first encoded bit stream and a second encoded bit stream so as to generate a multiplexed bit stream, the first encoded bit stream being output from an encoder circuit implemented in the first digital signal processing circuit, the second encoded bit stream being output from an encoder circuit implemented in the second digital signal processing circuit, and the generation circuit implemented in the first digital signal processing circuit generates an electric field information signal from the multiplexed bit stream, and gives the electric field information signal to a transmitter frontend circuit.

2. A signal processing device that includes a plurality of digital signal processing circuits, each of the plurality of digital signal processing circuits comprising:

a regeneration circuit configured to regenerate a bit stream from an electric field information signal that indicates an electric field of an optical signal;

an error correction circuit configured to correct an error in the regenerated bit stream;

an encoder circuit configured to add an error correction code to data so as to generate an encoded bit stream; and a generation circuit configured to generate an electric field information signal that indicates an electric field of an optical signal from the encoded bit stream, wherein the regeneration circuit in each of the plurality of digital signal processing circuits includes a compensator circuit configured to compensate for chromatic dispersion, non-linear distortion, or both of chromatic dispersion and non-linear distortion of an electric field information signal, a first compensator circuit implemented in the first digital signal processing circuit compensates for chromatic dispersion, non-linear distortion, or both of chromatic dispersion and non-linear distortion of an electric field information signal that is generated according to a received optical signal in a receiver frontend circuit, and a second compensator circuit implemented in the second digital signal processing circuit further compensates for chromatic dispersion, non-linear distortion, or both of chromatic dispersion and non-linear distortion of the electric field information signal in which chromatic dispersion, non-linear distortion, or both of chromatic dispersion and non-linear distortion has been compensated for by the first compensator circuit implemented in the first digital signal processing circuit.

3. A signal processing device that includes a plurality of digital signal processing circuits, each of the plurality of digital signal processing circuits comprising:
a regeneration circuit configured to regenerate a bit stream from an electric field information signal that indicates an electric field of an optical signal;
an error correction circuit configured to correct an error in the regenerated bit stream;
an encoder circuit configured to add an error correction code to data so as to generate an encoded bit stream; and
a generation circuit configured to generate an electric field information signal that indicates an electric field of an optical signal from the encoded bit stream, wherein
the regeneration circuit in each of the plurality of digital signal processing circuits includes a compensator circuit configured to compensate for chromatic dispersion, non-linear distortion, or both of chromatic dispersion and non-linear distortion of an electric field information signal,
the compensator circuit of each of the plurality of digital signal processing circuits is cascade-connected,
a first compensator circuit provided at a first-stage in a plurality of compensator circuits that are cascade-connected compensates for chromatic dispersion, non-linear distortion, or both of chromatic dispersion and non-linear distortion of an electric field information signal that is generated according to a received optical signal in a receiver frontend circuit,
each of the other compensator circuits in the plurality of compensator circuits further compensates for chromatic dispersion, non-linear distortion, or both of chromatic dispersion and non-linear distortion of the electric field information signal in which chromatic dispersion, non-linear distortion, or both of chromatic dispersion and non-linear distortion has been compensated for by its previous-stage compensator circuit, and
in a digital signal processing circuit that includes a last compensator circuit in the plurality of compensator circuits, the regeneration circuit regenerates a bit stream from the electric field information signal in which chromatic dispersion, the non-linear distortion, or both of chromatic dispersion and non-linear distortion has been compensated for, and the error correction circuit corrects an error in the bit stream that is output from the regeneration circuit.

4. A signal processing device that includes a plurality of digital signal processing circuits, each of the plurality of digital signal processing circuits comprising:
a regeneration circuit configured to regenerate a bit stream from an electric field information signal that indicates an electric field of an optical signal;
an error correction circuit configured to correct an error in the regenerated bit stream;
an encoder circuit configured to add an error correction code to data so as to generate an encoded bit stream; and
a generation circuit configured to generate an electric field information signal that indicates an electric field of an optical signal from the encoded bit stream, wherein
the regeneration circuit implemented in the first digital signal processing circuit includes:
a compensator circuit configured to compensate for chromatic dispersion, non-linear distortion, or both of chromatic dispersion and non-linear distortion of an electric field information signal that is generated according to a received optical signal in a receiver frontend circuit;
a frequency offset compensator circuit configured to compensate for a frequency offset of the electric field information signal that is output from the compensator circuit; and
a carrier phase recovery circuit configured to recover a carrier phase of the electric field information signal that is output from the frequency offset compensator circuit, and
the regeneration circuit implemented in the second digital signal processing circuit includes a digital filter configured to equalize the electric field information signal that is output from the carrier phase recovery circuit in the first digital signal processing circuit by using specified filter coefficients, and the regeneration circuit regenerates a bit stream from an output signal of the digital filter.

5. A signal processing device that includes a plurality of digital signal processing circuits, each of the plurality of digital signal processing circuits comprising:
a regeneration circuit configured to regenerate a bit stream from an electric field information signal that indicates an electric field of an optical signal;
an error correction circuit configured to correct an error in the regenerated bit stream;
an encoder circuit configured to add an error correction code to data so as to generate an encoded bit stream; and
a generation circuit configured to generate an electric field information signal that indicates an electric field of an optical signal from the encoded bit stream, wherein
in the first digital signal processing circuit, the encoder circuit adds an error correction code to client data so as to generate an encoded bit stream, and the generation circuit generates an electric field information signal from the encoded bit stream,
the regeneration circuit implemented in the second digital signal processing circuit includes a dispersion control circuit configured to control chromatic dispersion of an electric field information signal,
the dispersion control circuit controls chromatic dispersion of the electric field information signal that is generated by the generation circuit in the first digital signal processing circuit, and
the first digital signal processing circuit gives, to a transmitter frontend circuit, the electric field information signal that is output from the dispersion control circuit.

6. A signal processing device that includes a plurality of digital signal processing circuits, each of the plurality of digital signal processing circuits comprising:
a regeneration circuit configured to regenerate a bit stream from an electric field information signal that indicates an electric field of an optical signal;
an error correction circuit configured to correct an error in the regenerated bit stream;
an encoder circuit configured to add an error correction code to data so as to generate an encoded bit stream; and a generation circuit configured to generate an electric field information signal that indicates an electric field of an optical signal from the encoded bit stream, wherein the regeneration circuit implemented in the first digital signal processing circuit generates a first regenerated bit stream from an first electric field information signal generated by a first receiver frontend circuit, the error correction circuit implemented in the first digital signal processing circuit corrects an error in the first regenerated bit stream, the encoder circuit implemented in the first digital signal processing circuit adds an error correction code to first client data so as to generate a first encoded bit stream, the regeneration circuit implemented in the second digital signal processing circuit compensates for chromatic dispersion, non-linear distortion, or both of chromatic dispersion and non-linear distortion of a second electric field information signal generated by a second receiver frontend circuit, the generation circuit implemented in the second digital signal processing circuit generates an electric field information signal from the first encoded bit stream, and gives the electric field information signal to a first transmitter frontend circuit, a regeneration circuit implemented in a third digital signal processing circuit in the plurality of digital signal processing circuits generates a second regenerated bit stream from the electric field information signal in which chromatic dispersion, non-linear distortion, or both of chromatic dispersion and non-linear distortion is compensated for in the second digital signal processing circuit, an error correction circuit implemented in the third digital signal processing circuit corrects an error in the second regenerated bit stream, an encoder circuit implemented in the third digital signal processing circuit adds an error correction code to second client data so as to generate a second encoded bit stream, and a generation circuit implemented in the third digital signal processing circuit generates an electric field information signal from the second encoded bit stream, and gives the electric field information signal to a second transmitter frontend circuit.

7. A signal processing device comprising:

a first receiver frontend circuit configured to generate a first electric field information signal from a received optical signal by using local oscillation light having an optical frequency that is lower than a center frequency of the received optical signal;

a second receiver frontend circuit configured to generate a second electric field information signal from the received optical signal by using local oscillation light having an optical frequency that is higher than the center frequency of the received optical signal;

a transmitter frontend circuit;

a first digital signal processing circuit; and a second digital signal processing circuit, wherein each of the first digital signal processing circuit and the second digital signal processing circuit includes:

a compensator circuit configured to compensate for chromatic dispersion and non-linear distortion of an electric field information signal;

a regeneration circuit configured to regenerate a bit stream from the electric field information signal;

an error correction circuit configured to correct an error in the regenerated bit stream;

an encoder circuit configured to add an error correction code to data so as to generate an encoded bit stream; and a generation circuit configured to generate an electric field information signal that indicates an electric field of an optical signal from the encoded bit stream generated by the encoder circuit, and wherein a first compensator circuit implemented in the first digital signal processing circuit compensates for chromatic dispersion and non-linear distortion of the first electric field information signal, a second compensator circuit implemented in the second digital signal processing circuit compensates for chromatic dispersion and non-linear distortion of the second electric field information signal, the second digital signal processing circuit includes a combiner configured to combine the first electric field information signal that is output from the first compensator circuit and the second electric field information signal that is output from the second compensator circuit so as to generate a combined electric field information signal, a regeneration circuit implemented in the second digital signal processing circuit regenerates a bit stream from the combined electric field information signal that is output from the combiner, and an error correction circuit implemented in the second digital signal processing circuit corrects an error in the bit stream regenerated by the regeneration circuit.

\* \* \* \* \*